United States Patent Office 3,555,068
Patented Jan. 12, 1971

3,555,068
B - PERFLUOROALKYL - ETHYL
PHENYLCYCLOTRISILOXANES
George W. Holbrook, Midland, Mich., assignor to Dow Corning Corporation, Midland, Mich., a corporation of Michigan
No Drawing. Filed Dec. 18, 1968, Ser. No. 784,875
Int. Cl. C07f 7/08
U.S. Cl. 260—448.2       2 Claims

ABSTRACT OF THE DISCLOSURE

Cyclotrisiloxanes of the formula

are disclosed. A specific cyclotrisiloxane contains units of phenyltrifluoropropylsiloxane. The novel compounds can be polymerized to yield solid lubricants.

---

This invention relates to cyclotrisiloxanes containing fluorine groups in the side chain.

Siloxane polymers containing fluorohydrocarbon radicals and methyl radicals attached to the silicon atom are well-known for their heat stability and solvent resistance. Organosilicon compounds containing phenyl radicals attached to the silicon atom also have desirable properties. It would be advantageous to obtain a siloxane polymer containing both phenyl and fluorohydrocarbon radicals attached to the silicon atom.

It is an object of the invention to provide compositions which are particularly useful as intermediates in the preparation of organopolysiloxanes.

According to the invention there are provided cyclotrisiloxanes of the unit formula

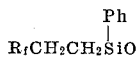

where $R_f$ is a perfluoroalkyl radical of from 1 to 10 carbon atoms inclusive, and Ph represents a phenyl radical.

For purposes of this invention, $R_f$ can be any perfluoroalkyl group of from 1 to 10 carbon atoms, such as $CF_3$, $C_2F_5$, $C_5F_{11}$ and $C_{10}F_{21}$. These perfluoroalkyl groups can be either straight or branched chain radicals.

The compositions of the invention can be prepared with chlorosilanes of the formula

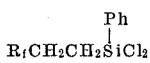

which in turn can be prepared by the reaction of an alkylene of the formula $R_fCH=CH_2$ with phenyldichlorosilane in the presence of a peroxide or platinum catalyst at temperatures of from 150 to 300° C. The chlorosilanes can be reacted in the presence of a metal oxide catalyst, such as zinc oxide, cupric oxide or lead oxide, to yield the cyclotrisiloxanes of the invention. Fractional distillation can be used to separate the cyclotrisiloxanes from other reaction products. Hydrolysis of the ethoxylated silanes and condensation of the diols also give a high yield of the cyclic trimer.

When the above defined chlorosilanes are hydrolyzed by conventional methods such as shown in U.S. Pat. 2,979,519, a mixture of cyclosiloxanes, the tetramer predominating, is obtained. The cyclic trimer in this mixture is essentially non-volatile and cannot be recovered by distillation. The cyclic tetramer will not polymerize, thus, this mixture has no utility in the preparation of higher polymers. For this reason the first mentioned method of preparation of the cyclic trimer is preferred.

The cyclic trimers of the invention can be polymerized by heating in the presence of an alkaline catalyst such as alkali metal hydroxide, quaternary ammonium hydroxide salts and siloxane salts of such hydroxides. The linear polysiloxanes obtained by such polymerization are useful fluids, elastomers and solids. The excellence of the high polymer as a solid lubricant is set forth in the copending application of C. L. Lee, Ser. No. 784,876, filed simultaneously herewith.

The following examples are illustrative and should not be construed as unduly limiting the invention which is properly delineated in the claims.

EXAMPLE 1

A solution of 200 ml. of ethyl ether and 170 g. of 5% HCl was heated to reflux temperature. 165 g. of $(CF_3CH_2CH_2)(Ph)Si(OEt)_2$ were added to the solution while stirring. The reaction mixture was refluxed for about 18 hours, separated, washed neutral and dried. The ether was distilled out of the mixture. Potassium hydroxide (1% by weight) was added to the reaction mixture and the mixture was distilled at less than 1 mm. Hg at a temperature of 165 to 230° C. to yield a yellow volatile material. IR spectra showed the volatile to contain about 50% of the cyclic trisiloxane and 50% of the cyclic tetrasiloxane.

EXAMPLE 2

and was prepared by condensation of the corresponding diol, $(CF_3CH_2CH_2)(Ph)Si(OH)_2$. The condensation of the diol was effected by refluxing with methanol and concentrated HCl for about 18 hours. The condensation product was a 50–50 mixture of cyclic trimer and tetramer.

EXAMPLE 3

The cyclic trimer and tetramer were prepared by reacting phenyltrifluoropropyldichlorosilane with zinc oxide in ethyl acetate. One and one-half liters of ethyl acetate, 605 g. of zinc oxide, and 176 g. of $Ph(CF_3CH_2CH_2)SiCl_2$ were mixed in a flask which was provided with a stirrer and condenser. The mixture was refluxed for about one hour during which a vigorous exothermic reaction took place. The reaction mixture was allowed to cool to room-temperature and ethylether was added. The solution was washed with water and solvent was stripped off.

The reaction product was then subjected to fractional distillation under reduced pressure, with the following fractions being recovered:

| Fraction: | Boiling point, ° C./mm. Hg | Weight, grams | Compound |
|---|---|---|---|
| 1 | | 3 | |
| 2 | 183/0.4 | 11 | Cyclic trimer. |
| 3 | 184/0.4 | 156 | Do. |
| 4 | 185/0.4 | 17 | Do. |
| 5 | 185–223/0.6 | 3 | Cyclic trimer and tetramer. |
| 6 | 225–227/0.6 | 42 | Cyclic tetramer. |
| 7 | >227/0.6 | 225 | Cyclic trimer and tetramer. |

This example demonstrates that high yields of the cyclic trimer of phenyltrifluoropropylsiloxane can be obtained.

That which is claimed is:
1. A cyclotrisiloxane of the unit formula

where Ph represents a phenyl radical and $R_f$ is a perfluoroalkyl radical of from 1 to 10 carbon atoms inclusive.

2. The cyclotrisiloxane of claim 1 wherein $R_f$ is a $-CF_3$ radical.

References Cited

UNITED STATES PATENTS

| 2,934,549 | 4/1960 | Tarrant et al. | 260—448.2 |
| 2,979,519 | 4/1961 | Pierce et al. | 260—448.2 |
| 3,070,617 | 12/1962 | Holbrook | 260—448.2 |
| 3,269,984 | 8/1966 | Vaughn | 260—448.2X |

TOBIAS E. LEVOW, Primary Examiner

P. F. SHAVER, Assistant Examiner

U.S. Cl. X.R.

252—49.6; 260—46.5